United States Patent [19]

Rogard

[11] 4,352,199

[45] Sep. 28, 1982

[54] METHOD AND DEVICE FOR DETECTING AND INTERPRETING A DISTRESS SIGNAL

[76] Inventor: Roger Rogard, Verdistraat 16, 2162 AV - Lisse, Netherlands

[21] Appl. No.: 205,447

[22] PCT Filed: Jan. 25, 1980

[86] PCT No.: PCT/EP80/00003

§ 371 Date: Sep. 24, 1980

§ 102(e) Date: Sep. 24, 1980

[87] PCT Pub. No.: WO80/01631

PCT Pub. Date: Aug. 7, 1980

[51] Int. Cl.³ .............................................. H04B 1/59
[52] U.S. Cl. ...................................... 455/31; 455/54; 455/63; 455/70
[58] Field of Search ....................... 455/31, 54, 63, 70

[56] References Cited

U.S. PATENT DOCUMENTS

| 3,432,755 | 3/1969 | Moreno . | |
|---|---|---|---|
| 3,581,208 | 5/1971 | Buehrle et al. | 455/54 |
| 3,668,526 | 6/1972 | Raskin | 455/54 X |
| 3,723,876 | 3/1973 | Seaborn, Jr. | 455/54X |
| 3,914,692 | 10/1975 | Seaborn, Jr. | 455/54 |

FOREIGN PATENT DOCUMENTS 2113907  6/1972  France .

OTHER PUBLICATIONS

Nachritentechnische Zeitschrift, vol. 30, No. 5, Published on 1977, (Berlin, DE) "Funk-Notruf über Satelliten", p. 364 see: left-hand col. line 59 to rt-hand col. ln. 29.
Funkschau, vol. 49, No. 1, Published on 1977, Marisat et al: "Schiffsfunk über Satelliten", pp. 34 to 36, see: p. 36, left-hand column lines 12 to 39.
NTG-Fachberichte, No. 52, Published on 1975, (Offenbach, DE), Bie Go et al: "Einflexibles Kinzept für kohärente Transponder", pp. 163-169.

Primary Examiner—Robert L. Richardson
Attorney, Agent, or Firm—Spencer & Kaye

[57] ABSTRACT

An emergency telecommunications system wherein the distress signals are transmitted repeatedly in successive sequences each comprised of a detect interval during which an alarm signal is transmitted and of a message transmit interval during which the distress message itself is transmitted indicating particularly the identity of the ship, its location and the nature of distress. During the detect interval, the transmitted signal is comprised of a carrier phase modulated by a sub-carrier, the frequency of the latter being a multiple of the information transmission speed. During the message transmit interval, the information is superposed to the sub-carrier by phase binary modulation. The presence of an alarm signal during each detect interval is detected in an alarm receiver monitoring the receive frequency band simuitaneously in several channels of different narrow bandwidths so as to generate a control signal which indicates the presence of a distress signal in anyone of the channels. In response to this control signal, the message signal received during the subsequent message transmit interval is controlled accurately, and demodulated and interpreted coherently in a message receiver so as to restore the distress message.

5 Claims, 6 Drawing Figures

METHOD AND DEVICE FOR DETECTING AND INTERPRETING A DISTRESS SIGNAL

BACKGROUND OF THE INVENTION

The present invention relates to a telecommunications system especially intended for safely and reliably signaling ships in emergency condition. More particularly, the invention concerns a method for producing, detecting and interpreting in a reliable way a distress signal comprising inter alia such information as the identity and the location of a ship in emergency condition, and an apparatus for carrying out said method.

At the present time, it is common to use radioelectric (HF or VHF) telecommunications systems for signaling emergency condition at sea. Such communication links, however, are subject to wave propagation instabilities which seriously diminish the speed at which the links are established and the efficiency of such communications, which makes it uncertain whether the emergency help will be provided in time.

Improvement in safety and distress service may already be expected by using a maritime satellite which permits to improve the speed of telephone or telex communications with shore terminals. However, the telecommunication equipments which are now used are cumbersome and expensive, so that their use, under normal conditions, is currently limited to ships of relatively high burden. In case of a shipwreck, these equipments are not protected from injury due to the emergency condition encountered by the ship (e.g. explosion, fire), which renders the situation of the shipwrecked men dramatic or even catastrophic.

With such a situation there is still a need for a telecommunications system especially intended for servicing distress messages at sea, which proves to be really efficient and reliable even in the most unexpected situations and which only requires a simple ship terminal equipment that is least bulky and least expensive than a conventional telecommunications terminal.

In order to meet with the safety requirements for the distress communications, it is first preferable to provide mobile stations which are autonomous, that is stations which are not incorporated in the installations aboard the ships and which use simple telecommunications equipment. Further, the transmission should be organized to ensure high safety and efficiency, and the receive equipment at the shore terminals should be capable of responding to distress signals of very low levels and severely distorted by parasitic disturbance, thereby to enable the establishment of telecommunication links between mobile stations and shore terminals with possible relay by a maritime communications satellite.

The invention solves the above problem by providing a telecommunication process and a receive apparatus which permit to meet with the safety and reliability requirements as stated above.

A first object of this invention is a telecommunication process especially designed for producing and transmitting distress signals from simple mobile stations and for detecting and interpreting said signals in an accurate and reliable manner at shore monitoring terminals.

Another object of the invention is a receive apparatus for distress signals which is especially arranged for detecting and processing severely distorted, very low level distress signals with a high probability and accuracy, even under the most unexpected emergency conditions.

According to the invention, the telecommunication process is arranged to transmit distress signals repeatedly in succeeding sequences each comprising two parts of predetermined duration: a detect interval during which is transmitted an alarm signal, and a message transmit interval during which there is transmitted the distress message itself including inter alia information relating to the identity of the ship in emergency condition, the location thereof and the nature of emergency. During the detect interval, the transmitted signal is comprised of a carrier phase-modulated by a sub-carrier having a frequency which is a multiple of the information transmission rate. During the message transmit interval, the information is superimposed to the sub-carrier by binary phase modulation. The presence of an alarm signal during each detect interval is detected in order to produce a command signal which indicates the occurrence of a distress signal. In response to said command signal, the message signal received during the subsequent message transmit interval is coherently demodulated and processed in order to reliably restore the distress message.

The receive apparatus comprises an alarm receiver arranged to monitor the receive frequency band simultaneously in several channels having each a distinct narrow bandwidth and to produce a detect signal in response to an alarm signal being detected in any of said channels during the alarm detect interval, a transfer control logic arranged to produce a command signal in response to a detect signal being generated, and a message receiver arranged to be responsive to said command signal for processing the distress signal received during the message transmit interval in order to restore the message by coherent phase demodulation.

The message receiver comprises a controller arranged to accurately determine the carrier frequency of the received signal and to control the amplitude quality thereof in order to compensate for the frequency and phase instabilities, and thereafter to enable the reproduction of the message in conventional phase demodulator circuitries which produce a train of bits representing the distress message. The message receiver further comprises a correlator for synchronizing the message and an integrator for integrating the messages received during succeeding message transmit intervals. After having been perfectly processed so as to remove all the ambiguities resulting from the demodulation procedure, the distress message is decoded in a conventional character decoder.

Owing to their performances and the high accuracy provided in the detection and processing operation, the process and apparatus of the invention can be used with a maritime communications satellite, e.g. a MARECS type satellite, in order to relay the distress signals transmitted from the mobile stations.

BRIEF DESCRIPTION OF THE DRAWINGS

The accompanying drawings schematically illustrate an exemplary embodiment of the telecommunications system in accordance with the invention:

FIG. 6 is a block diagram of the message receiver circuit arrangement.

DESCRIPTION OF AN EMBODIMENT

Figure 1:
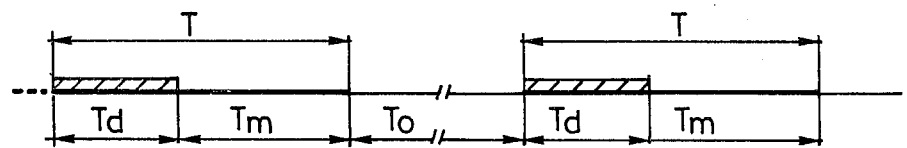
FIG. 1 is a diagram showing the transmit sequence for distress signals.

In order to attain the end of the invention with regard to the safety and reliability of detection and interpretation of the distress signals, said signals are repeatedly transmitted during a sufficiently long time period to enable a shore terminal to detect these signals with a high probability and certainty. Each distress signal is comprised of sequences which succeed at regular intervals. As shown on FIG. 1 each sequence T comprises two parts: an alarm detect interval Td and a message transmit interval Tm. The alarm detect interval Td has for instance a duration of 8 seconds and the message transmit interval Tm has for instance a duration of 12 seconds. The succeeding sequences T are advantageously separated by a dead time To. During the alarm detect interval Td, the signal is comprised of a carrier $f_1$ phase-modulated by a sub-carrier $f_2$ (called the alarm signal) with a low modulation ratio (e.g. m=1.2).

Figure 2:
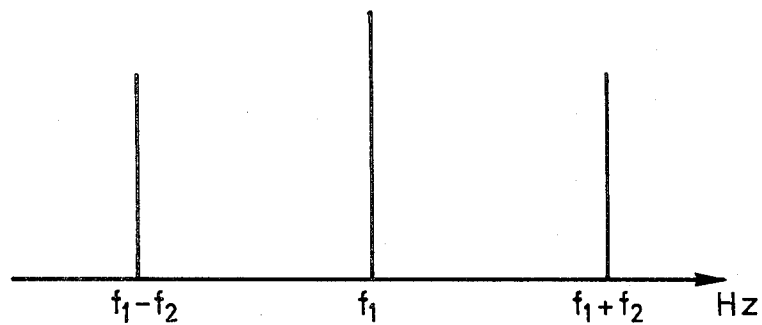
FIGS. 2 and 3 are frequency diagrams showing the alarm and message signals.

The signal is thus comprised of three rays (the carrier and the two sub-carrier lateral rays) as illustrated in FIG. 2. This signal constitutes an alarm signal which will be detected at the receive terminal.

Figure 3:
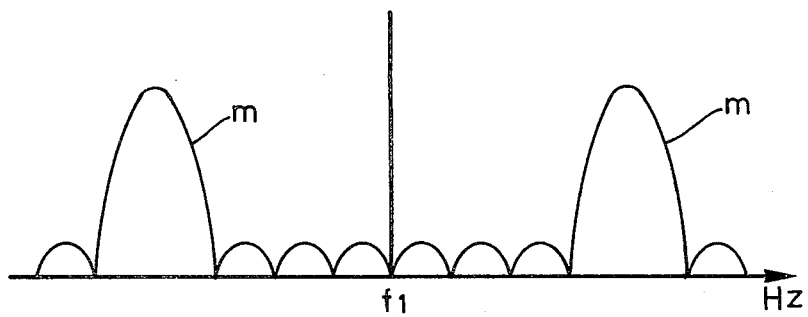

During the message transmit interval, the distress message is superimposed to the sub-carrier $f_2$ by binary phase modulation. The sub-carrier has a low frequency, e.g. 240 Hz. The message, which includes the ship identification, its location and the nature of emergency, is comprised of a plurality of characters in a binary code having for instance thirty-two elements. The message signal which is transmitted during the second interval Tm is illustrated on FIG. 3. This signal is comprised of the ray of carrier $f_1$ and the modulation spectrum m of the information carrying sub-carrier.

The modulation circuitries used are conventional phase modulation circuits which do not need to be described here. Such circuits are relatively simple so that the mobile stations are of little bulk and inexpensive; as a consequence, they can be installed on board ships of any burden. For safety reasons, as stated hereinbefore, the mobile stations are preferably installed on autonomous buoys.

As regards the characteristics of the distress signals, it will be pointed out that said signals can be very low in level, substantially lower than the nominal value of normal telephone signals, in particular when the signals transmitted by a mobile station are repeated by a communications satellite. Further, said signals are distorted by parasitic disturbances which are substantially generated in the satellite and the level of which can range as high as the distress signal level itself and also distorted by phase noise generated in the transmission chain. In addition, the transmitted signals are subject to frequency instabilities that are more particularly due to the buoy transmitter and to the erratic movement of the buoy at the mercy of the waves, which results in some non-negligible Doppler effect with respect to the frequency bandwidths of the receive circuitries. Due to said characteristics of the distress signals, it is mandatory for the system reliability that all the frequency variations which occur during the signal transmission are taken into account at the receive shore terminals and that the parasitic signals do not produce false alarms. The receive circuitries at the shore terminals are thus specially arranged in accordance with this invention to detect the presence of an alarm signal during the detect interval Td and to interpret and process the message signal in each transmit sequence with a high reliability while taking into account the particular signal characteristics as briefly described hereinbefore.

Figure 4:
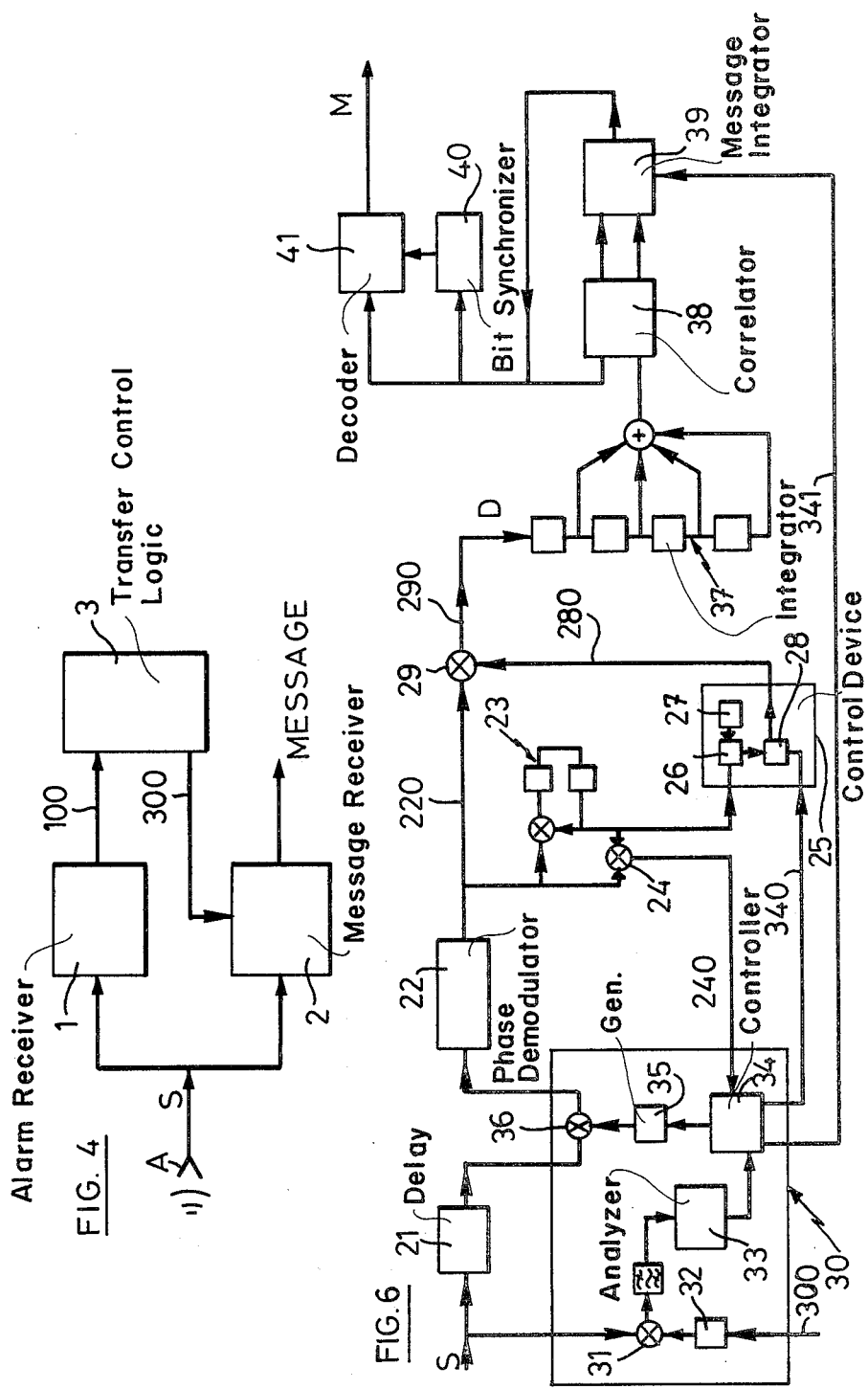
FIG. 4 is a simplified schematic diagram of the receive circuitries at a shore terminal according to the invention.

The arrangement of the receive circuitries at a shore terminal in accordance with the invention is described hereinafter with reference to FIGS. 4 to 6. As shown in FIG. 4, the receive circuitries comprise an alarm receiver 1, a message receiver 2 and a transfer control logic 3. The reference numeral A denotes a receive antenna to which the receivers 1 and 2 are connected.

The alarm receiver 1 accepts and monitors the receive frequency bandwidth simultaneously in a number of distinct narrow channels during each detect interval in order to detect the presence of an alarm signal in any of said channels. When the antenna A senses a distress signal S, receiver 1 produces a detect signal 100. In response to said detect signal, the transfer control logic 3 generates a command signal 300 for the message receiver 2, said command signal identifying the transmit channel in which the distress signal has been detected. Implementing the transfer logic 3 is within the normal skill of the man of the art. The message receiver 2 is arranged to process the distress signal during the message transmit intervals Tm in the successive sequences T after it has received the command signal 300. The arrangement of message receiver 2 is specially designed so as to control the distress signal with high accuracy prior to coherently demodulate same as will be described later herein.

Figure 5:
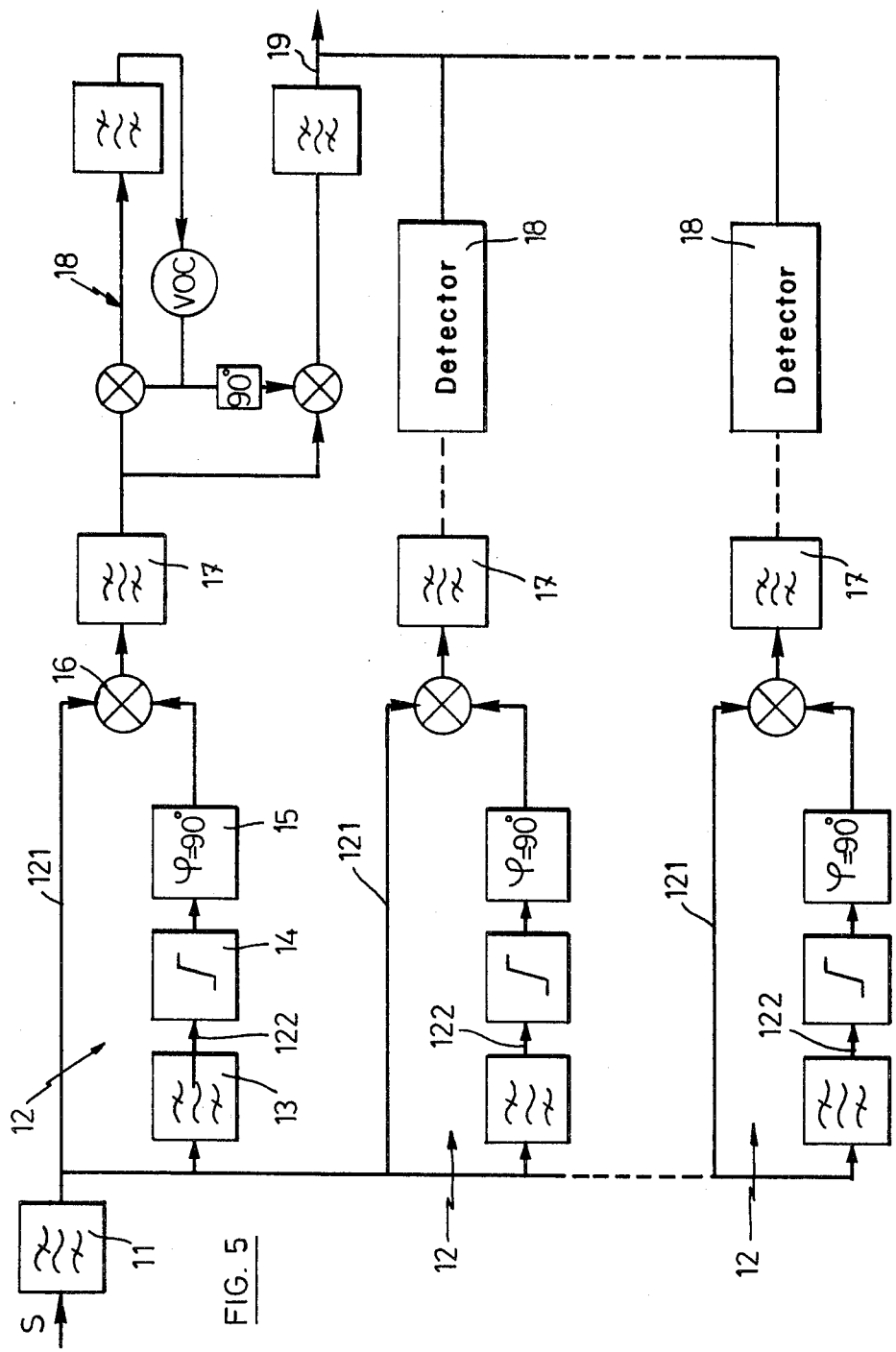
FIG. 5 is a block diagram of the alarm receiver circuit arrangement.

The circuit arrangement of receiver 1 is illustrated in FIG. 5. Filter 11 is a band-pass filter circuit having the function, known per se, of delimiting the bandwith of the receive frequency band. The receiver comprises several detection circuits connected in parallel with each other, each of said circuits having the function of monitoring one respective narrow channel in the receive frequency band. Each detection circuit is operative to restore the carrier frequency $f_1$ with a high certitude. In each detection circuit, the distress signal S is applied to a carrier restore circuit 12 comprising two paths: a direct path 121 in which the signal S is not subject to any processing operation and a phase-shift path 122. Filter 13 is a narrow bandwidth filter circuit which serves to delimit the bandwidth of one channel. The filters 13 in all of the detection circuits have the same bandwidth but their respective frequency bands are centered on staggered center frequencies. The frequency bands of these channels are chosen to be in overlapping relationship. The bandwidth must be sufficiently narrow to limit the demodulation losses, but must be as wide as possible, however, to reduce the number of detection circuits to be connected in parallel. By way of example, a 50 Hz bandwidth is felt satisfactory. Apart from their center frequencies, all the phase-shift paths are similar to each other. The device denoted 14 is a limiting circuit having the purpose of reducing the amplitude noise and the device 15 is a 90°-phase-shift circuit. All these circuits are well known in the art. The direct signal from path 121 and the phase-shifted signal from path 122 are combined in multiplier circuit 16, known per se, so that the multiplier output is the sub-carrier $f_2$. Filter 17 is operative to select the nominal frequency of the sub-carrier; this filter has a narrow bandwidth, e.g. 3 Hz. Circuit 18 is a coherent detection circuit consisting of a conventional phase loop which is operative to detect the occurrence of the sub-carrier frequency $f_2$ in the respective channel, that is the frequency of an alarm signal, and to produce a command signal when an alarm signal occurs. Thereby, when receiver 1 detects the presence of an alarm signal in any channel in the monitored frequency band, during a detect interval Td in the transmit sequence, a detect signal 100 is applied to line 19 which is connected to transfer control logic 3 (FIG. 4). With the detection arrangement as described above, the detection losses and the number of false alarms are substantially reduced. For parasitic signals being able to produce an alarm, it is practically necessary that two such signals occur which have a frequency deviation exactly equal to the sub-carrier frequency. Such requirement is felt restrictive enough to ensure an efficient protection against false alarms and hence a satisfactory detection reliability.

As soon as an alarm signal is detected during an alarm detect interval Td, the message receiver 2 is caused to operate in order to process the distress signal during the subsequent message transmit interval Tm and restore said message. For the message receiver 2 to operate it is necessary that it has an input signal which identifies the numbers of the channel in which the distress signal has been detected. As stated hereinbefore, it is the command signal 300 which identifies said channel number. The transfer control logic 3 (FIG. 4) is arranged to produce said command signal 300.

The message receiver 2 is arranged to process the distress signal S in the identified channel in the most coherent manner as possible. As explained above, the carrier frequency has been determined during the alarm detect interval Td with a certitude equal to the bandwidth of the filters 13, which bandwidth, it is recalled, is for instance about 50 Hz. While taking said bandwidth into consideration, the message receiver 2 should be arranged with a view to reduce the demodulation losses at the time when the distress signal is demodulated. Prior to proceed with said demodulation, the message receiver 2 according to the invention performs a very accurate control of the carrier frequency $f_1$ with a view to maintain said frequency at the middle point of a narrow bandwidth of about 5 Hz for instance.

The circuit arrangement of the message receiver 2 is schematically illustrated in FIG. 6. The device denoted 21 is a delay means, known per se, which is effective to delay the distress signal S in order to postpone the demodulation thereof until the above-mentioned control process is completed. The circuit 22 is a phase demodulator similar to circuit 12 in the alarm receiver 1 but with a filter having a narrower bandwidth in the phase shift path thereof, e.g. a filter having a 5 Hz bandwidth. The output signal from circuit 22 is the sub-carrier $f_2$ during the alarm detect interval Td and the sub-carrier modulated by the message during the message transmit interval Tm. The device denoted 23 is a conventional phase loop which serves to detect the sub-carrier $f_2$ during the alarm detect intervals. The multiplier 24 is operative to multiply the output signal from phase demodulator 22 with the sub-carrier produced by the loop 23 and produce a signal 240 representing the presence of a non-modulated sub-carrier.

The device denoted 30 is the control device arranged to proceed to the frequency and quality controls as explained above. The received distress signal S is first multiplied in multiplier 31 with a reference signal 32 which is adjusted by the command signal 300 from logic 3 (FIG. 4) during the alarm detect interval. The output from multiplier 31 is analyzed in an analyzing device 33 arranged to determine the spectral components of the received distress signal and produce a signal representing the carrier frequency. A controller 34, which consists of a logic arrangement, has the function of controlling the generation, by generator 35, of a signal having a determined frequency deviation relative to the carrier frequency in response to said signal 240 which indicates the occurrence of sub-carrier $f_2$. The multiplier 36 is effective to multiply the output signal from delay device 21 with the output signal from generator 35. As soon as it receives signal 240 which, in fact, indicates the presence of a message, the controller 34 generates an enable signal 340 which serves to enable the sub-carrier to be restored with its correct phase for the purpose of coherently restoring the message. The controller 34 also generates a signal 341 which represents the amplitude quality of the received signal S, that is a signal representing the level of the signal-to-noise ratio of signal S. The function of said signal 341 will be described later hereinafter.

The sub-carrier $f_2$ produced by the phase loop 23 has its phase adjusted in a control device 25 comprising a comparator 26 connected to compare the sub-carrier with the clock signal from an internal clock 27 and a phase-shifter 28 connected to be responsive to said enable signal 340 for producing the sub-carrier on line 280 with the correct phase. With the sub-carrier being correctly restored, the received distress signal is allowed for being demodulated. The demodulation circuitry substantially comprises the multiplier 29 connected to multiply the modulated sub-carrier from the phase demodulator 22 on line 220 with the sub-carrier $f_2$ applied on line 280, thereby to ensure the coherent reproduction of the distress message from the modulated signal. The message appears on line 290 as a train of binary bits D.

The device denoted 37 is an integrator effective to integrate the data D during one bit duration. As the bit frequency is derived from the internal clock by frequency division, there is ambiguity with respect to the phase of said integration and at this stage the ambiguity is not removed. In the message receiver according to the invention the four possible signals are processed. The device denoted 38 is a correlator, a device well known in the art, and device 39 is a message integrator. The correlator 38 has the function of phasing the messages from integrator 37 with the output from integrator 39. The latter is effective to superimpose the message contained in the actual transmit sequence to the message which has been integrated during the preceeding transmit sequences in order to perform a weighted sum adjusted by the quality signal 341 from controller 34. As soon as the quality of the message as a whole is satisfactory, a bit synchronization device 40 removes the ambiguity relative to the bit synchronization, which enables the character decoder 41 to decode the message in order to restore the intelligible message M.

Owing to the high accuracy of detection and interpretation of the distress signals with the process and apparatus according to the invention and owing to the performances achieved thereby, the invention enables distress telecommunication links to be established with relay by maritime communications satellites, e.g. a MA- RECS satellite. In that case, the signals are transmitted within a defined frequency range in the frequency allocation assigned to satellite communications, at a low transmission rate, e.g. 60 bauds. Such a satellite telecommunications system is capable of an excellent geographical coverage of oceans and seas with a comparatively simple telecommunication equipment.

What is claimed is:

1. An emergency telecommunication process for producing a distress signal repeatedly transmitted from a mobile station in successive sequences and for detecting and interpreting the distress signal with a high reliability at a shore terminal, said process comprising the steps of:

transmitting in each sequence of the distress signal, an alarm signal during a first time interval and a message signal during a second time interval, said alarm signal being only comprised of a carrier phase-modulated by a sub-carrier and said message signal being comprised of a carrier which is phase-modulated by a sub-carrier to which the information is superimposed by binary phase modulation;

detecting the alarm signal at a shore terminal during said first time interval for producing a command signal indicating the occurrence of a distress signal; and controlling and demodulating the message signal during said second time interval in response to said command signal so as to restore the distress message.

2. A receive apparatus for distress signals comprising an alarm signal during a first time interval and a message signal during a second time interval, the alarm signal being comprised of a carrier which is phase-modulated by a sub-carrier and the message signal being comprised of a carrier which is phase-modulated by a sub-carrier to which the information is superimposed by binary phase modulation, said receive apparatus comprising:

alarm receiver means arranged for monitoring a receive frequency band simultaneously in a plurality of channels each having a distinct narrow bandwidth and for producing a detect signal in response to an alarm signal being detected in any of said channels during the first time interval;

transfer logic means arranged to respond to the detect signal for producing a command signal which identifies the channel in which the alarm signal is detected; and message receiver means connected for accepting the distress signal and arranged for responding to said command signal and for controlling and thereafter processing the message signal received during said second time interval so as to restore the distress message.

3. A receive apparatus according to claim 2, wherein the alarm receiver means comprise a plurality of detection circuit means each arranged to detect the presence of an alarm signal in a respective channel having a narrow bandwidth, each detection circuit means comprising, connected in series, a carrier restore circuit, a sub-carrier select filter means and a phase loop detection circuit, the latter circuit being arranged to produce said detect signal in response to an alarm signal being detected.

4. A receive apparatus according to claim 2, wherein the message receiver means comprise delay means connected to accept the distress signal and to delay it by a predetermined time interval;

first phase demodulator means connected to the output of the delay means for demodulating the received signal and restoring the modulated sub-carrier;

detection means connected to the phase demodulator means and arranged to detect the sub-carrier and produce a detect signal in response to the occurrence of said sub-carrier;

control means connected between the input and the output of the delay means, said control means comprising means for analyzing the frequency spectrum of the distress signal and generating a signal representing the carrier frequency, logic means responsive to said detect signal and arranged to produce a command signal which depends on the output from the analyzing means, said logic means being further arranged to produce an enable signal in response to said detect signal and a signal representing the amplitude quality of the distress signal, controlled-voltage frequency generator means responsive to said command signal to generate a signal having a determined frequency deviation relative to the carrier, and multiplier means connected to multiply the output from the delay means with the output signal from said frequency generator;

phase control means connected to be responsive to the enable signal and control the phase of the sub-carrier from the detection means; and second phase demodulator means arranged to demodulate the output from the first phase demodulator means with the restored sub-carrier thereby to produce the train of message bits.

5. A receive apparatus according to claim 4, wherein the message receiver means further comprise, connected in series, correlator means having an input connected to accept the message bits from the second phase demodulator means, and message integrator means arranged to integrate the message over succeeding transmit sequences, the correlator means having a second input connected to the output of said message integrator means thereby to correlate the phase of the message restored during a transmit sequence with the phase of the integrated message from the message integrator means.

* * * * *